United States Patent [19]
Kashiwagi

[11] Patent Number: 5,191,366
[45] Date of Patent: Mar. 2, 1993

[54] ASPHERICAL LENS, METHOD OF PRODUCING THE LENS AND APPARATUS FOR PRODUCING THE LENS

[76] Inventor: Toyohiko Kashiwagi, 3-35-23 Mozunakamachi, Sakai-shi Osaka-fu 591, Japan

[21] Appl. No.: 671,485

[22] Filed: Mar. 19, 1991

[51] Int. Cl.⁵ .......................... G02C 7/04; A61F 2/16
[52] U.S. Cl. ............................... 351/177; 351/160 R; 623/6
[58] Field of Search .................. 351/159, 177, 160 R, 351/160 H, 161, 162; 623/6

[56] References Cited

U.S. PATENT DOCUMENTS 4,838,675  6/1989  Barkan et al. .................. 351/169 X

*Primary Examiner*—Scott J. Sugarman
*Attorney, Agent, or Firm*—Koda and Androlia

[57] ABSTRACT

The present invention relates to an aspherical lens as a refracting and correcting means for an eye, such as an intraocular lens and a contact lens, a method of producing the lens, and an apparatus for producing the lens. According to the present invention, it is possible to produce a lens which entirely removes a spherical aberration by arbitrarily controlling the spherical aberration and has an arbitrary focal depth and resolving power.

In the present invention, ray tracing is performed for an incident ray, a final passing point of the ray is compared with a preset desired final passing point, and a slope of a curved surface corresponding to the ray is determined so that both final passing points coincide with each other.

Furthermore, the shape of a lens is found by determining surface slopes respectively corresponding to heights of rays with respect to the optical axis as described above.

5 Claims, 4 Drawing Sheets

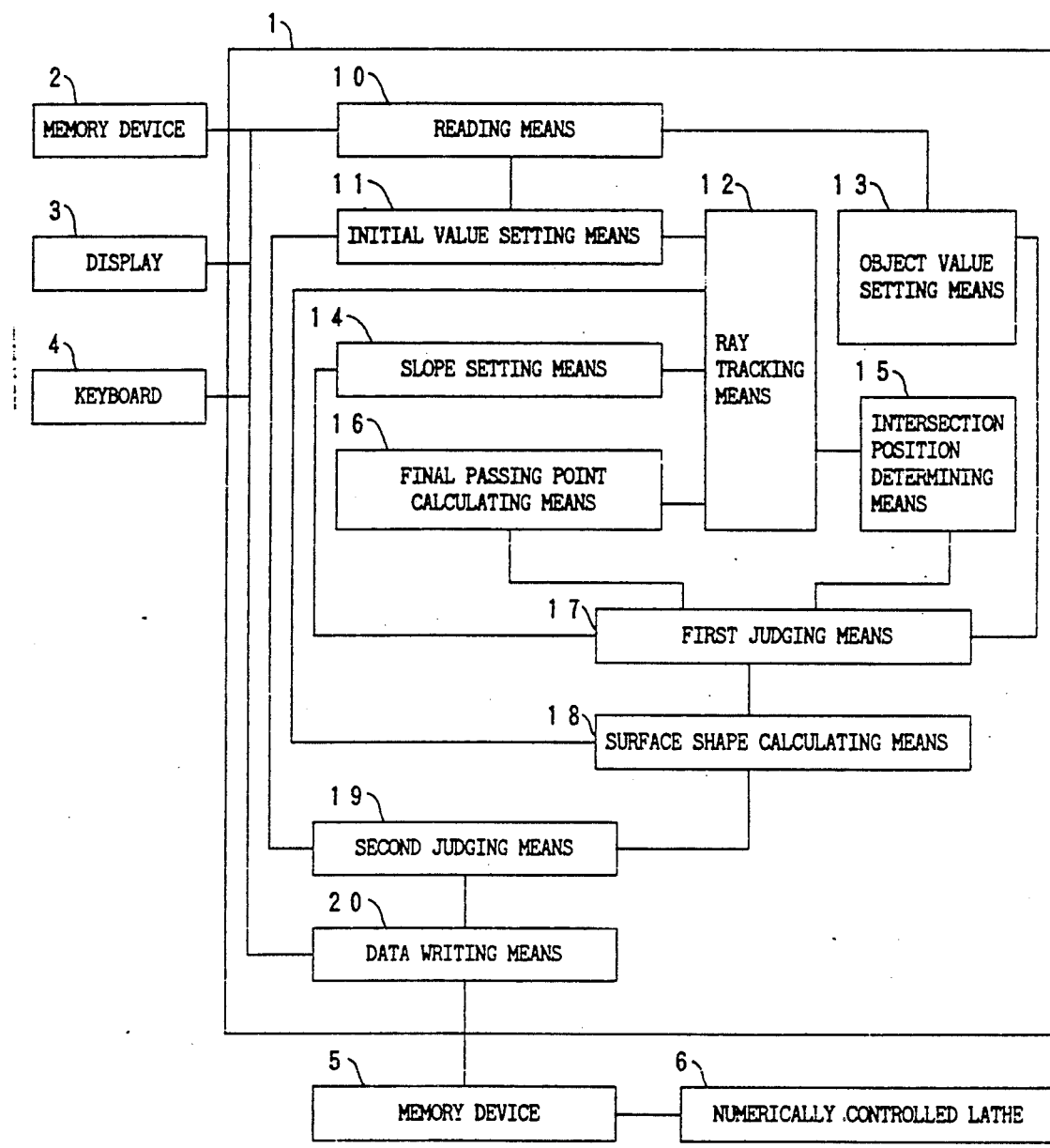
F I G. 3

ASPHERICAL LENS, METHOD OF PRODUCING THE LENS AND APPARATUS FOR PRODUCING THE LENS

BACKGROUND OF THE INVENTION

1. Field of the Invention

The present invention relates to an aspherical lens as a refracting and correcting means for eyes, such as an intraocular lens and a contact lens, a method of producing the aspherical lens, and an apparatus for producing the aspherical lens.

2. Description of the Related Art

Conventionally, for example, an intraocular lens is generally designed by expressing asphericity of the intraocular lens in a polynomial of even order showing differences between an aspherical surface thereof and a spherical surface, performing ray tracing while changing a coefficient of the polynomial and calculating an aberration, or by expressing the asphericity in a special algebraic function instead of the polynomial.

However, the above methods are disadvantageous in that an expression of the asphericity is limited to one expressible by an algebraic function and the degree of freedom of design is also restricted.

For example, in the case of a refracting curved surface in rotation symmetry with respect to the optical axis, a radius of curvature of a point is determined by the distance between the point and the optical axis. If the radius of curvature is expressed by a radius of curvature depending on the distance from the optical axis, the radii of curvature of different two points have a regular relationship therebetween depending on the shape of an algebraic function and the radii of the points cannot be separately changed.

Accordingly, the degree of freedom of design is generally restricted in a method which uses an algebraic function to express asphericity, and for example, it is impossible to design an intraocular lens from which entirely removes the spherical aberration, and so on.

In general, since the quality of an image in a fovea of macular region in an eye-ball optical system has an influence on visual acuity, how to control a spherical aberration is one of the most important problems in producing an intraocular lens and a contact lens.

SUMMARY OF THE INVENTION

An object of the present invention is to provide an aspherical lens, such as an intraocular lens and a contact lens, which entirely removes a spherical aberration by arbitrarily controlling the spherical aberration or which has an arbitrary focal depth and resolving power, a method of producing the aspherical lens, and an apparatus for producing the aspherical lens.

In order to achieve the above object, according to the present invention, the shape of a refracting curved surface of a lens to be designed is not set by using an algebraic function like a conventional manner, but by determining the slope of the surface at a point where a ray at an arbitrary height above the optical axis passes so that the ray passes through a preset desired final passing point after passing through the lens, and designing the shape of the whole surface based on the slope of the surface at the arbitrary height of the ray.

In other words, the present invention provides an aspherical lens, a method of producing the lens and an apparatus for producing the lens. According to one aspect of the present invention, a method of producing an aspherical lens which uses a ray tracing method comprises the steps of: performing ray tracing for an incident ray R and finding the position of an intersection PT of the ray R and a refracting curved surface; setting a desired final passing point PO through which the ray R, passing through the intersection PT, passes after being refracted by a final refracting surface; arbitrarily determining a slope T of the curved surface at the intersection PT and finding a final passing point P of the ray R according to the surface slope T; comparing positions of the final passing point P and the preset desired final passing point PO and sequentially changing the surface slope T so that the positions of the final passing point P and the desired final passing point PO coincide with each other; determining the surface slope T, when the positions of the final passing point P and the desired final passing point PO coincide with each other, as a desired surface slope at the intersection PT; and sequentially changing a height h and/or an angle of the incident ray R with respect to an optical axis L and calculating the shape of the curved surface based on individual positions of the intersections PT and the surface slopes T at the intersections PT.

According to another aspect of the present invention, a method of producing an aspherical lens which uses a ray tracing method comprises the steps of: performing ray tracing for an incident ray R and finding the position of an intersection PT of the ray R and a specific refracting curved surface; setting a desired final passing point PO through which the ray R, passing through the intersection PT, passes after being refracted by a final refracting surface; arbitrarily determining a slope T1 of the curved surface at the intersection PT and finding a final passing point P1 of the ray R corresponding to the surface slope T1; determining a slope T2 of the curved surface while changing the slope at the intersection PT and finding a final passing point P2 of the ray R corresponding to the surface slope T2; comparing the positions of the final passing points P1 and P2 and the preset desired passing point PO and sequentially determining a new surface slope T by interpolation or extrapolation based on preceding two surface slopes, final passing points P corresponding to the slopes, and the desired final passing point PO when the final passing points P1 and P2 do not coincide with the desired final passing point PO; determining the surface slope T, when the final passing point P corresponding to the changed predetermined surface slope T and the desired final passing point PO coincide with each other, as a desired surface slope at the intersection PT; and sequentially changing a height h or an angle of the incident ray R with respect to the optical axis L and calculating the shape of the curved surface based on individual positions of the intersections PT and the surface slopes T at the intersections PT.

According to further aspect of the present invention, an apparatus for producing an aspherical lens by using a ray tracing method comprises: intersection position determining means for performing ray tracing for an incident ray R and finding the position of an intersection PT of the ray R and a refracting curved surface; object value setting means for setting a desired final passing point PO through which the ray R, passing through the intersection PT, passes after being refracted by a final refracting surface; slope determining means for arbitrarily determining a surface slope T at the intersection PT; final passing point calculating means for finding a final passing point P of the ray R corresponding to the surface slope T determined by the slope determining means; judging means for comparing positions of the final passing point P and the preset desired final passing point PO, sequentially changing the surface slope T of the slope determining means so that the final passing point P and the desired final passing point PO coincide with each other, and determining the surface slope T, when the final passing point P and the desired final passing point PO coincide, as a desired surface slope; initial value setting means for sequentially changing a height h and/or an angle of the incident ray R with respect to an optical axis L; surface shape calculating means for calculating the shape of the curved surface based on individual positions of the intersections PT and the surface slopes T at the intersections PT; and a memory device 5 for storing the shape of the surface found by the surface shape calculating means, wherein the lens can be processed by a numerically controlled device based on information of the memory device 5.

According to still further aspect of the present invention, an apparatus for producing an aspherical lens by using a ray tracing method comprises: intersection position determining means for performing ray tracing for an incident ray R and finding the position of an intersection PT of the ray R and a specific refracting surface; object value setting means for setting a desired final passing point PO through which the ray R, passing through the intersection PT, passes after being refracted by a final refracting-surface; means for arbitrarily determining a surface slope T1 at the intersection PT by a slope determining means and finding a final passing point P1 of the ray R corresponding to the surface slope T1; means for determining a surface slope T2 while changing the slope at the intersection PT and finding a final passing point P2 of the ray R corresponding to the surface slope T2; judging means for comparing the final passing points P1 and P2 and the preset desired passing point PO, sequentially changing a new surface slope T by interpolation or extrapolation based on preceding two surface slopes, final passing points P corresponding to the slopes and the desired final passing point PO when the final passing points P1 and P2 do not coincide with the desired final passing point PO, and determining the surface slope T, when the final passing point P corresponding to the changed predetermined surface slope T and the desired final passing point PO coincide with each other, as a desired surface slope at the intersection PT; surface shape calculating means for sequentially changing a height h and/or an angle of the incident ray R with respect to an optical axis L and calculating the shape of the curved surface based on individual positions of the intersections PT and the surface slopes T t the intersections PT; and a memory device 5 for storing the shape of the surface found by the surface shape calculating means, wherein the lens can be processed by a numerically controlled device based on information of the memory device 5.

In an aspherical lens according to the present invention, a desired final passing point PO, through which an incident ray R, having passed through an intersection PT of the ray R and a specific refracting curved surface, passes after being refracted by a final refracting surface, is previously set, and a surface slope T at the intersection PT is set so that a final passing point P of the ray R passing through the intersection PT coincides with the desired final passing point PO.

In the present invention having the above structure, a slope T of a curved surface at a predetermined height h from an optical axis L of a specific refracting surface is determined so that an incident ray R passing at the height h passes through a preset final passing point PO after passing through a final refracting surface.

Furthermore, the height h or an angle of the incident ray R is sequentially changed, and the shape of the whole surface is calculated and designed based on slope values of individual heights h of the surface.

In other words, a specific refracting curved surface in an optical system is selected as a curved surface to be designed, and means of the present invention are applied to the selected surface.

The position of an intersection PT where an incident ray R passes through a designed refracting surface (the height from the optical axis and the distance in the axial direction) is found by ray tracing and a surface slope T at the intersection PT is sequentially changed.

In other words, the first two surface slopes T1 and T2 are arbitrarily determined, and the third and subsequent slopes T each are determined by interpolation or extrapolation based on preceding two slopes thereof, two final passing points P corresponding to the two surface slopes, and a desired final passing point PO.

The surface slope T at the intersection PT is thus determined, and set as a desired surface slope when the final passing point at the slope T coincides with the desired passing point PO.

Furthermore, the height h of the incident ray R is sequentially changed, surface slopes at different heights are similarly determined, and the shapes of the surface with respect to the intersections PT at the heights are set one after another.

If the incident ray R is made incident from the side near the optical axis L and the incident angle is gradually increased, the surface slopes can be also determined from near the optical axis of the surface.

The ray which is incident into the arbitrary surface determined as above certainly passes through the desired final passing point PO.

BRIEF DESCRIPTION OF THE DRAWINGS

FIG. 3 is a block diagram of an apparatus of the present invention.

DETAILED DESCRIPTION OF THE PREFERRED EMBODIMENT

Figure 1A:
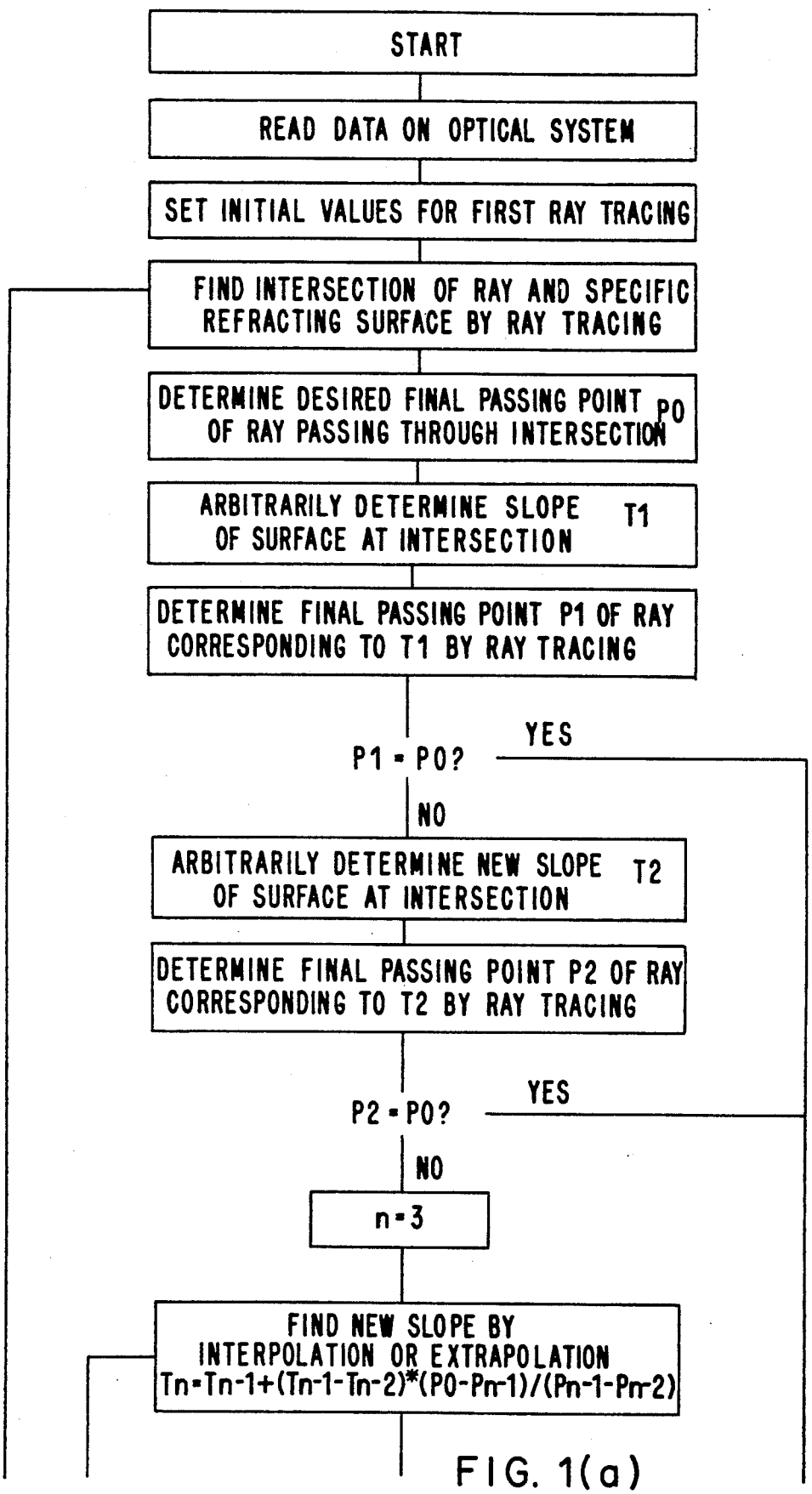
FIGS. 1(a) and 1(b) are is a flowcharts of an embodiment according to the present invention.

An embodiment in which the present invention is applied to an intraocular lens for removing a spherical aberration of an eye-ball optical system will now be described.

Referring to FIG. 3, numeral 1, 2, 3, 4, 5 and 6 denote a calculation device, a memory device, a display device, a keyboard, a memory device and a numerically controlled lathe.

The calculation device 1 is composed of a CPU and designs a lens according to a control program written in an unillustrated memory.

The memory device 2 stores various kinds of information necessary for the design of an intraocular lens, such as the radii of curvature of front and rear planes of a cornea and front and rear planes of the intraocular lens, the distance from the cornea and the intraocular lens to a refracting surface, the refractive index of a medium, information on which refracting surface is to be designed, an initial value of a tracing ray, information on whether the height from the optical axis and/or the angle changes if the initial value of the tracing ray is changed, a pitch of the change, and information for setting an object value.

An object value setting means 13 is built in the calculation device 1 and finds desired final passing points PO of a ray R with respect to intersections PT of a curved surface, which is designed based on information appropriately read from the memory means 2 by a reading means 10, and the ray R. In this embodiment, a common desired final passing point PO is set in order to design an intraocular lens for removing a spherical aberration.

A slope setting means 14 can arbitrarily determine a slope T of a curved surface to be designed.

An intersection PT position determining means 15 finds the position of the intersection PT of the ray R traced by a ray tracing means 12 and the curved surface to be designed (the height h from the optical axis and the position in the axial direction).

A final passing point calculating means 16 traces by the tracing means 12 the ray R at the surface slope T arbitrarily determined by the slope setting means 14, and finds a final passing point P of the ray R.

A first judging means 17 compares the final passing point P found by the final passing point calculating means 16 and the desired final passing point PO, and confirms whether or not the final passing point P and the desired final passing point PO coincide with each other. Until the final passing point P and the desired final passing point PO coincide with each other, the slope setting means 14 are repeatedly operated according to interpolation or extrapolation.

A surface shape calculating means 18 calculates the shape of the curved surface based on individual positions of the intersections PT and surface slopes at the intersections PT, which are separately found, by sequentially changing the height h or an angle of the incident ray R.

A second judging means 19 confirms whether or not the shape of the curved surface is completely fixed. When the shape of the curved surface is completely fixed, information thereof is written in the memory device 5 through a data writing means 20, and the numerically controlled lathe 6 is operated according to the information.

Figure 1B:
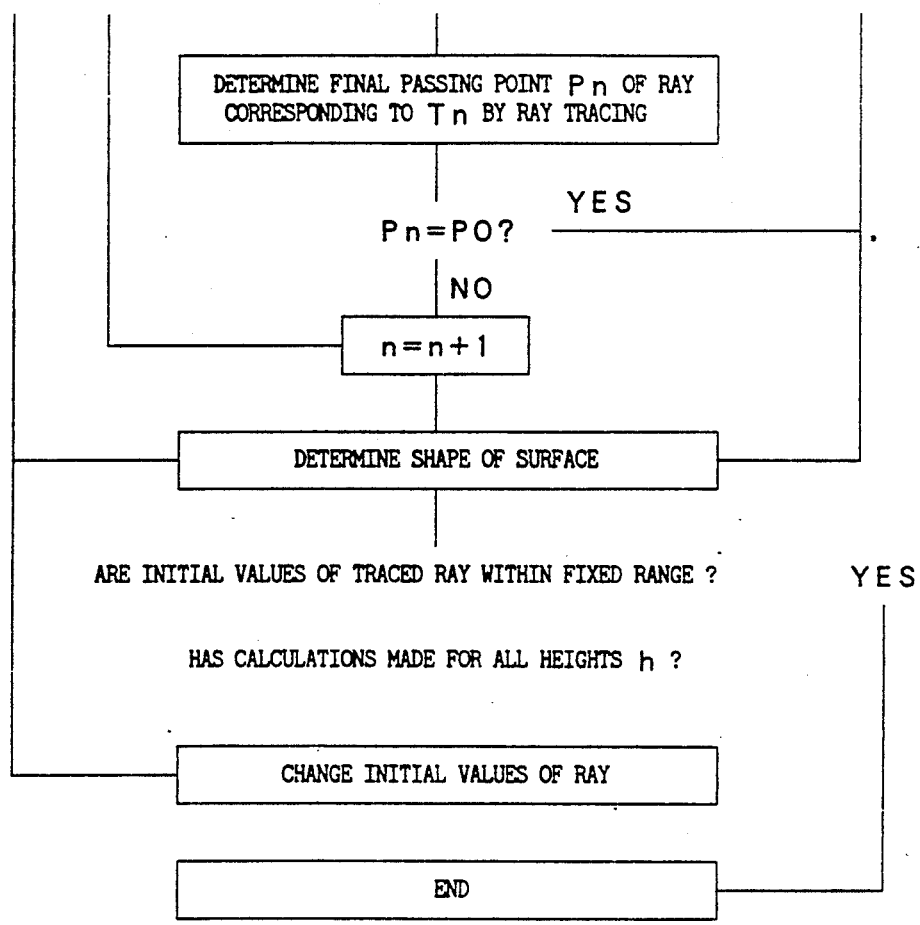
Figure 2:
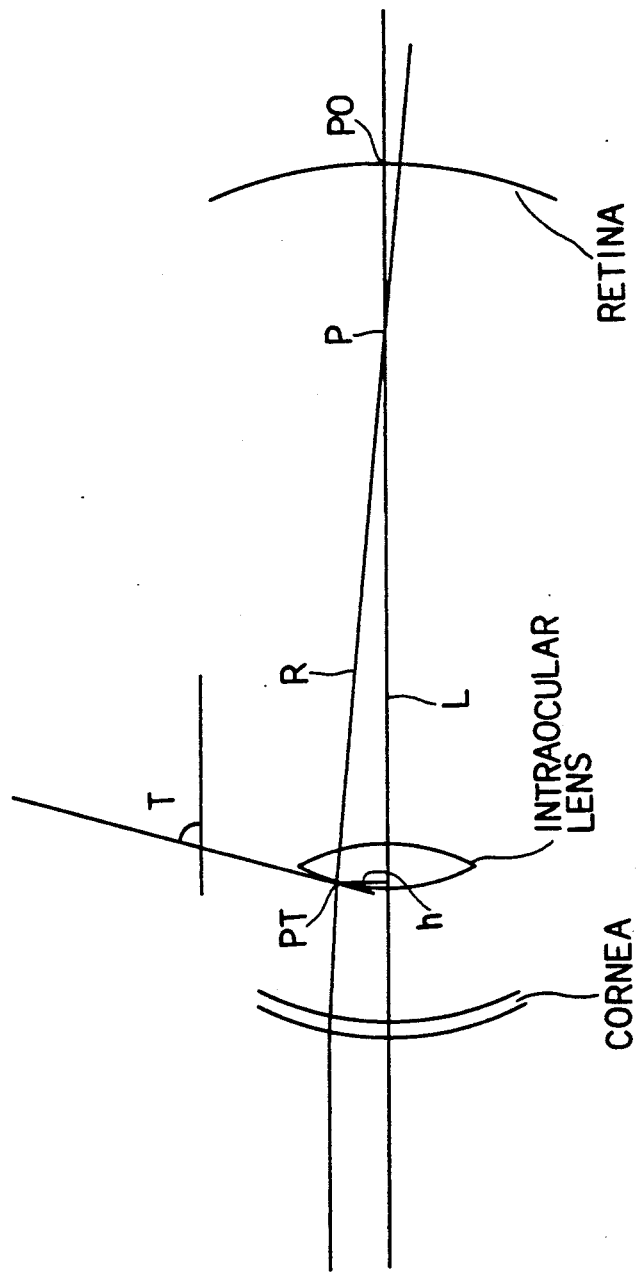
FIG. 2 is a schematic view of an eye-ball with an intraocular lens fitted therein.

The apparatus of the present invention has the above structure. The production of a lens by using the apparatus will be described with reference to FIG. 1.

First, a specific file in the memory device 2 is selected in response to the selection by the keyboard 4, the above predetermined information is read by the reading means 10, and initial values of the first tracing ray R are set by an initial value setting means 11 based on the information. Ray tracing is performed in accordance with the initial values of the ray by using the ray tracing means 12, passing points on a curved surface to be designed (the heights h from the optical axis and the axial positions) is found by the intersection position determining means 15 and a desired final passing point PO corresponding to intersections PT on the designed surface is found by the object value setting means 13.

Subsequently, an arbitrary surface slope T1 at the intersection PT is determined by the slope setting means 14, ray tracing is performed at the surface slope T1, and a final passing point P1 of the ray is found by the final passing point calculating means 16. The first judging means 17 confirms by comparison whether the final passing point P1 and the desired final passing point PO coincide with each other.

If the final passing point P1 coincides with the desired final passing point PO, the surface slope T1 is determined as a desired surface slope.

When it is supposed that the final passing point P1 does not coincide with the desired final passing point PO, a surface slope T2 different from the surface slope T1 is determined at the intersection PT, and a final passing point P2 at the surface slope T2 is found in the same manner as above.

If it is confirmed by comparison whether or not the final passing point P2 and the desired final passing point PO coincide with each other, and it is judged that the points PO and P2 coincide, the surface slope T2 is determined as a desired slope. Furthermore, if the points PO and P2 do not coincide, another surface slope is determined.

In other words, the third and subsequent slopes T are determined by interpolation or extrapolation based on preceding two slopes thereof, final passing points P respectively corresponding to the two slopes found by the ray tracing and the desired final passing point PO. Then, a final passing point P corresponding to the determined surface slope is found, and the final passing point P and the desired final passing point PO are compared again by the first judging means 17. Surface slopes at the same intersection PT are repeatedly changed and determined one after another by the slope setting means 14 until the final passing point P and the desired final passing point PO coincide with each other. When both final passing points coincide, the slope T at that time is set as a desired surface slope.

If the distance of the intersection in the direction of the optical axis L is changed while the surface slopes T are changed one after another so as to find the final passing point P, the change is determined by the intersection position determining means 15.

Furthermore, the initial values are changed and the surface slopes T of the different incident rays R are found one after another, so that the shape of the curved surface is determined by the surface shape calculating means 18 step by step.

When the shape of the surface is determined, the shape is used as the basis of calculation with regard to the next height. In other words, the position of the intersection PT of the ray R and the designed surface in the direction of the optical axis L changes in accordance with the design, and the change is calculated based on the set shape of the surface and the next surface slope T.

Then, the second judging means 19 confirms whether or not the shape of the surface is completely set. If the shape is fixed, data on the shape is written in the memory device 5 by the writing means 20, and the numerically controlled lathe 6 operates according to the data so as to process a lens.

In the lens shaped as above, since the refracting surface is designed so that the incident ray R at the intersection PT certainly passes through the desired final passing point PO, it is possible to produce lenses having various kinds of characteristics.

For example, if the above desired final passing point PO is set at a common point for the heights, a lens which entirely removes a spherical aberration can be produced, and if the desired final passing points PO are set at two points, a bifocal lens can be produced. Furthermore, when a lens thus having a plurality of focuses is produced, the positions of the final passing points each corresponding to intersections are stored in the memory device 2.

The present invention is not limited to the above embodiment. For example, a means for making the final passing point P coincide with the desired final passing point PO is into limited to interpolation or extrapolation as described above.

Since the present invention is structured as described above, it is possible to easily produce a lens which entirely removes a spherical aberration with respect to a specific conjugate point within a range of geometrical optics.

Furthermore, it is also possible to change a desired final passing point at a desired height with respect to the optical axis of the lens more easily than the prior art. For example, a bifocal lens can be produced by setting two desired final passing points.

Therefore, the present invention is especially optimal for the production of an intraocular lens and a contact lens which enables an object to be clearly seen without spherical aberration. In addition, since it is possible to arbitrarily set a spherical aberration and to precisely process a bifocal lens or a lens having a plurality of focuses, it is remarkably advantageous for practical use.

What is claimed is:

1. A method of producing an aspherical lens which uses a ray tracing method, comprising the steps of:

performing ray tracing for an incident ray R and finding the position of an intersection PT of said ray R and the refracting curved surface;

setting a desired final passing point PO through which said ray R, passing through the intersection PT, passes after being refracted by a final refracting surface;

arbitrarily determining a slope T of said curved surface at the intersection PT and finding a final passing point P of said ray R corresponding to the surface slope T;

comparing positions of said final passing point P and said preset desired final passing point PO and sequentially changing the surface slope T so that the positions of said final passing point P and said desired final passing point PO coincide with each other;

determining the surface slope T, when the positions of said final passing point P and said desired final passing point PO coincide with each other, as a desired surface slope at the intersection PT;

sequentially changing a height H and/or an angle of said incident ray R with respect to an optical axis L and calculating the shape of said curved surface based on individual positions of intersections PT and surface slopes T at the intersections PT; and forming a lens in accordance with the calculated shape of said curved surface based on said individual positions of said intersections PT and said surface slopes T at said intersections PT.

2. A method of producing an aspherical lens which uses a ray tracing method, comprising the steps of:

performing ray tracing for an incident ray R and finding the position of an intersection PT of said ray R and a specific refracting curved surface;

setting a desired final passing point PO through which said ray R, passing through the intersection PT, passes after being refracted by a final refracting surface;

arbitrarily determining a slope T1 of said curved surface at the intersection PT and finding a final passing point P1 of said ray R corresponding to the surface slope T1;

determining a slope T2 of said curved surface while changing the slope at the intersection PT and finding a final passing point P2 of said ray R corresponding to the surface slope T2;

comparing the positions of said final passing points P1 and P2 and said preset desired passing point PO and sequentially determining a new surface slope T by interpolation or extrapolation based on preceding two surface slopes, final passing points P corresponding to the two slopes, and said desired final passing point PO when said final passing points P1 and P2 do not coincide with said desired final passing point PO;

determining the surface slope T, when said final passing point P corresponding to the changed predetermined surface slop T and said desired final passing point PO coincide with each other, as a desired surface slope at the intersection PT;

sequentially changing a height h or an angle of said incident ray R with respect to an optical axis L and calculating the shape of said curved surface based on individual positions of intersections PT and surface slopes T at the intersections PT; and forming a lens in accordance with the calculated shape of said curved surface based on said individual positions of said intersections PT and said surface slopes T at said intersections PT.

3. An apparatus for producing an aspherical lens by using a ray tracing method, comprising:

intersection position determining means for performing ray tracing for an incident ray R and finding the position of an intersection PT of said ray R and a refracting curved surface;

object value setting means for setting a desired final passing point PO through which said ray R, passing through the intersection PT, passes after being refracted by a final refracting surface;

slope determining means for arbitrarily determining a surface slope T at the intersection PT:

final passing point calculating means for calculating a final passing point P of said ray R corresponding to the surface slope T determined by said slope determining means;

judging means for comparing positions of said final passing point P and said preset desired final passing point PO, sequentially changing the surface slope T of said slope determining means s that said final passing point P and said desired final passing point PO coincide with each other, and determining the surface slope T, when said final passing point P and said desired final passing point PO coincide, as a desired surface slope;

initial value setting means for sequentially changing a height h and/or an angle of said incident ray R with respect to an optical axis L;

surface shape calculating means for calculating the shape of said curved surface based on individual positions of intersections PT and surface slopes T at the intersections PT;

a memory device for storing the shape of said surface formed by said surface shape calculating means; and a numerically controlled device for forming said lens based on shape information in said memory device.

4. An apparatus for producing an aspherical lens by using a ray tracing method, comprising:

intersection position determining means for performing ray tracing for an incident ray R and finding the position of an intersection PT of said ray R and a specific refracting surface;

object value setting means for setting a desired final passing point PO through which said ray R, passing through the intersection PT, passes after being refracted by a final refracting surface;

means for arbitrarily determining a surface slope T1 at the intersection PT by a slope determining means and finding a final passing point P1 of said ray R corresponding to the surface slope T1;

means for determining a surface slope T2 while changing the slope at the intersection PT and finding a final passing point P2 of said ray R corresponding to the surface slope T2;

judging means for comparing said final passing point P1 and P2 and said preset desired passing point PO, sequentially changing a new surface slope T by interpolation or extrapolation based on preceding two surface slopes, final passing point P corresponding to the two slopes and said desired final passing point PO when said final passing points P1 and P2 do not coincide with said desired final passing point PO, and determining the surface slope T, when said final passing point P corresponding to the changed predetermined surface slope T and said desired final passing point PO coincide with each other, as a desired surface slope at the intersection PT;

surface shape calculating means for sequentially changing a height h and/or an angle of said incident ray R with respect to an optical axis L and calculating the shape of said curved surface based on individual positions of intersections PT and surface slopes T at the intersections PT;

a memory device for storing the shape of said surface found by said surface shape calculating means; and a numerically controlled device for forming said lens based on shape information in the memory device.

5. An aspherical lens wherein a desired final passing point PO through which an incident ray R, passing through an intersection PT of said ray R and a specific refracting curved surface, passes after being refracted by a final refracting surface, is previously set, and a surface slope T at the intersection PT is set so that a final passing point P of said ray R passing through the intersection PT coincides with said desired final passing point PO.

* * * * *